United States Patent [19]

Ward et al.

[11] Patent Number: 4,826,587

[45] Date of Patent: * May 2, 1989

[54] HYDROCRACKING PROCESS

[75] Inventors: John W. Ward, Yorba Linda, Calif.; Timothy L. Carlson, Grand Junction, Colo.; William S. Millman, Brookfield, Wis.

[73] Assignee: Union Oil Company of California, Los Angeles, Calif.

[*] Notice: The portion of the term of this patent subsequent to May 14, 2002 has been disclaimed.

[21] Appl. No.: 32,205

[22] Filed: Mar. 30, 1987

Related U.S. Application Data

[60] Division of Ser. No. 793,566, Oct. 31, 1985, Pat. No. 4,672,048, which is a continuation-in-part of Ser. No. 695,850, Jan. 28, 1985, Pat. No. 4,563,434, which is a division of Ser. No. 406,498, Aug. 9, 1982, Pat. No. 4,517,073, which is a continuation-in-part of Ser. No. 84,761, Oct. 15, 1979, Pat. No. 4,419,271.

[51] Int. Cl.$^4$ .............................................. C10G 47/20
[52] U.S. Cl. .................................... 208/111; 208/123; 208/124
[58] Field of Search ...................... 208/111, 123, 124; 502/64, 66, 69, 70, 60

[56] References Cited

U.S. PATENT DOCUMENTS

| | | | |
|---|---|---|---|
| 4,419,271 | 12/1983 | Ward | 502/66 X |
| 4,429,053 | 1/1984 | Ward | 208/111 X |
| 4,517,073 | 5/1985 | Ward et al. | 502/66 |
| 4,565,621 | 1/1986 | Ward | 208/111 |
| 4,576,711 | 3/1986 | Ward et al. | 208/111 |
| 4,664,776 | 5/1987 | Ward | 208/111 |
| 4,672,048 | 6/1987 | Ward | 502/66 |

Primary Examiner—Glenn Caldarola
Attorney, Agent, or Firm—Yale S. Finkle; Gregory F. Wirzbicki

[57] ABSTRACT

Hydrocracking catalysts comprise a Group VIB and/or non-noble metal Group VIII hydrogenation component in conjunction with an LZ-210 zeolite preferably of $SiO_2:Al_2O_3$ greater than 9.0, which zeolite has been hydrothermally treated and ammonium ion-exchanged. In a preferred embodiment, the zeolite is essentially free of rare earth metals, and most preferably, essentially free of all metals except the Group VIB or non-noble Group VIII.

29 Claims, No Drawings

HYDROCRACKING PROCESS

CROSS-REFERENCE TO RELATED APPLICATIONS

This application is a division of U.S. patent application Ser. No. 793,566 filed on Oct. 31, 1985, now U.S. Pat. No. 4,672,048, which application is a continuation-in-part of (1) U.S. patent application Ser. No. 695,850 filed Jan. 28, 1985, now U.S. Pat. No. 4,563,434 which application is itself a division of U.S. patent application Ser. No. 406,498 filed Aug. 9, 1982, now U.S. Pat. No. 4,517,073, which itself is a continuation-in-art of U.S. patent application Ser. No. 84,761 filed Oct. 15, 1979, now U.S. Pat. No. 4,419,271, (2) U.S. patent application Ser. No. 697,258 filed Feb. 1, 1985, now U.S. Pat. No. 4,576,711, which application is itself a continuation of U.S. patent application Ser. No. 406,498 filed Aug. 9, 1982, now U.S. Pat. No. 4,517,073, which itself is a continuation-in-part of U.S. patent application Ser. No. 84,761 filed Oct. 15, 1979, now U.S. Pat. No. 4,419,271, (3) U.S. patent application Ser. No. 746,186 filed June 18, 1985, and (4) U.S. patent application Ser. No. 699,919 filed Feb. 8, 1985, now U.S. Pat. No. 4,610,973, which itself is a continuation of U.S. patent application Ser. No. 531,924 filed Sept. 13, 1983, now U.S. Pat. No. 4,517,074, which itself is a division of U.S. patent application Ser. No. 84,761 filed Oct. 15, 1979, now U.S. Pat. No. 4,419,271. Both U.S. Pat. No. 4,517,073 and U.S. Pat. No. 4,419,271 are herein incorporated by reference in their entireties.

INTRODUCTION

The present invention relates to a hydrocracking catalyst and process, and particularly to a zeolite-containing hydrocracking catalyst and its use in hydrocracking gas oil feeds and the like into gasoline.

Hydrocracking is a well-known refining process wherein, in its typical form, a relatively high boiling hydrocarbon feedstock is upgraded by contact with a hydrocracking catalyst under conditions of elevated temperature and pressure and the presence of added hydrogen. In hydrocracking, the catalyst promotes two reactions, first the cracking of a substantial proportion of the hydrocarbon components of the feedstock and, second, the saturation of the resultant products by hydrogenation. The net result of hydrocracking is that the relatively high boiling feed is converted into a lower boiling feed with a greater proportion of components boiling in a desired range, e.g., $C_4+$ to 420° F. in the case of hydrocracking to produce gasoline, 300° to 700° F. in the case of midbarrel hydrocracking to produce diesel fuel, and 300° to 550° F. in the case of midbarrel hydrocracking to produce certain aviation fuels.

For the production of gasoline from gas oils and the like, the typical hydrocracking catalyst is composed of one or more Group VIB or VIII metals on a support comprising a zeolite having catalytic cracking activity. One such zeolite is known as LZ-210, disclosed most fully in U.S. Pat. No. 4,503,023 issued to Breck et al. and assigned to Union Carbide, which patent is herein incorporated by reference in its entirety. LZ-210 is a distinctive form of zeolite in that, while its crystal structure is similar to a Y zeolite, it has an unusually high framework silica-to-alumina ratio, above 6.0, due to the extraction of aluminum from the Y zeolite structure by contact with an aqueous solution of a fluorosilicate salt and incorporation of silicon from the solution into the zeolite structure.

In a subsequent disclosure, in European Patent Application No. 84104815.0, Publication No. 0124120, published Nov. 7, 1984 by Best et al., also assigned to Union Carbide, which patent application is herein incorporated by reference in its entirety, two forms of LZ-210, denominated LZ-210-T and LZ-210-M, are disclosed, with the former being thermally or hydrothermally treated form of LZ-210 and the latter a LZ-210 zeolite exchanged with a multivalent metal, preferably a rare earth metal or mixture of rare earth metals. Both LZ-210-T and LZ-210-M have a silica-to-alumina ratio between 6.0 and 9.0, and this because Best et al. teach that a dramatic loss in hydrocracking performance results when the silica-to-alumina ratio exceeds 9.0. Specifically, what Best et al. teach is: "Surprisingly, it has been found that when the $SiO_2$ to $Al_2O_3$ ratio of LZ-210-T is equal to or greater than 9.0 that the use of LZ-210-T falls off in its hydrocracking performance. Although the reasons for this markedly different performance are not known at present it is clear that the silica to alumina range of between greater than 6.0 and equal to or less than 9.0 is critical in the development of hydrocracking catalysts based upon LZ-210-T and LZ-210-M."

The Best et al. patent application also teaches the benefits of exchanging an LZ-210 zeolite with multivalent metals, particularly rare earth metals. The benefits disclosed are improved catalyst activity and along life as compared to other forms of LZ-210 and as compared to Y zeolites. Another disclosed benefit is an improvement in rejuvenability.

It should be noted that neither the Breck et al. patent nor the Best et al. patent application, above cited, are to be construed as admitted prior art as to the present invention.

SUMMARY OF THE INVENTION

In the present invention it has been surprisingly found that hydrocracking catalysts comprising a hydrothermally treated and ammonium-exchanged LZ-210 zeolite having a silica-to-alumina ratio above 9.0 have higher catalytic activity than similar catalysts containing LZ-210 zeolite of lower silica-to-alumina ratio. Accordingly, the present invention is directed to a hydrocracking catalyst containing one or more hydrogenation components selected from the Group VI and VIII metals on a support comprising a hydrothermally treated and ammonium-exchanged LZ-210 zeolite of silica-to-alumina ratio above 9.9, preferably between about 10 and 20, and most preferably from 11 to 15.

In the preferred embodiment, the catalyst is essentially free of Group VIII noble metals and contains non-noble Group VIII metals instead. The non-noble Group VIII metal may be distributed upon the catalyst support in any convenient manner, but in a preferred embodiment, the catalyst contains a novel zeolite containing the non-noble metal cation exchanged into the LZ-210 zeolite.

In another embodiment of the invention, it has been discovered that LZ-210 zeolites, exchanged with one or more rare earth metals, have lower activity for hydrocracking when the hydrocracking catalyst is promoted with a non-noble Group VIII metal. Therefore, for non-noble metal hydrocracking catalysts, it is critical in the invention that the LZ-210 zeolite be essentially free of rare earth metals, and even more preferably, essentially free of all metals except hydrogenation metals selected from the group consisting of Group VIB metals and nonnoble Group VIII metals.

In yet another embodiment of the invention, it has been found that, even for LZ-210 zeolites having a silica-to-alumina ratio as low as 6.0, one may obtain useful hydrocracking results with non-noble Group VIII metals present as a hydrogenation promoter. However, because the best results have been found to be obtained at a silica-to-alumina ratio above 9.0, all the preferred embodiments of the present invention employ an LZ-210 zeolite of silica-to-alumina ratio above 9.0.

The following definitions pertain to the present application. The term "noble metal; refers to platinum, palladium, rhodium, iridium, ruthenium, and osmium. The term "rare earth metal" refers to lanthanum, cerium, praseodymium, neodymium, samarium, europium, gadolinium, terbium, dysprosium, holmium, erbium, thulium, ytterbium, and lutetium.

DETAILED DESCRIPTION OF THE INVENTION

In the present invention, hydrocracking catalysts are provided containing as a cracking component a form of LZ-210 zeolite, and specifically an LZ-210 zeolite having a silica-to-alumina ratio above 6.0, preferably above 9.0, and more preferably from 10 to 20. Generally, LZ-210 zeolites prove unstable to thermal treatment at a $SiO_2:Al_2O_3$ ratio somewhere between about 15 and 20. It is for this reason that the most preferred LZ-210 zeolites herein have a silica-to-alumina ratio from 10 to 15, with the most highly preferred LZ-210 zeolite having a silica-to-alumina ratio from 11 to 15.

The most preferred LZ-210 zeolites of the present invention have, in the dehydrated state, a chemical composition expressed in terms of mole ratios of oxides as $$(0.85\text{-}1.1)M_{2/n}O:Al_2O_3:xSiO_2$$

wherein "M" is a cation having the valence "n" and "x" is a value between about 10 and about 15, and most preferably between about 11 and about 15, having extraneous silicon atoms in its crystal lattice in the form of $SiO_4$ tetrahedra, preferably in an average amount of at least 1.0 per 10,000Å$^3$, and having an X-ray powder diffraction pattern having at least the d-spacings set forth in the table below:

TABLE I

| d(Å) | Intensity |
|---|---|
| 14.30–13.97 | very strong |
| 8.71–8.55 | medium |
| 7.43–7.30 | medium |
| 5.66–5.55 | strong |
| 4.75–4.66 | medium |
| 4.36–4.28 | medium |
| 3.76–3.69 | strong |
| 3.30–3.23 | strong |
| 2.88–2.79 | strong |

The Breck patent previously mentioned provides a detailed method for preparing LZ-210 zeolites, as well as a detailed explanation of the properties of LZ-210 zeolites (i.e., their defect structure and the like). The preferred embodiment of the present invention requires the use of those LZ-210 zeolites which, through appropriate treatment of a Y zeolite or the like with a fluorosilicate, have a silicate-to-alumina ratio above 9, more preferably between 10 and 20, and most preferably between 10 and 15. In the usual case, the preferred LZ-210 zeolite is prepared by contacting and reacting a Y zeolite of $SiO_2:Al_2O_3$ between 3 and 6, and preferably an ammonium-exchanged Y zeolite of $SiO_2:Al_2O_3$ between 3 and 6, at a temperature usually from 20° to 95° C. with a fluorosilicate, preferably ammonium fluorosilicate, in an amount and under conditions such that sufficient of the framework aluminum atoms are removed and replaced with silicon atoms resulting in a final $SiO_2:Al_2O_3$ above 9.0. Usually, the amount of fluorosilicate and the conditions of contacting/reacting are such that at least 60 percent, preferably at least 75 percent, more preferably at least 80 percent, and most preferably at least 90 percent, of the crystal structure of the original Y zeolite is retained. After reaction is complete, the LZ-210 zeolite is removed from the contacting/reacting medium, generally washed with deionized or distilled water, and then dried, usually at a temperature between 20° and 50° C.

The LZ-210 zeolite is then stabilized by a hydrothermal treatment. Typically, the zeolite is contacted at an elevated temperature, usually in the range of 500° C. to the temperature at which the zeolite loses substantial crystallinity, preferably in the range of 500° to 850° C., with a flowing gas stream which contains sufficient water vapor to impart a partial pressure of at least 0.2 p.s.i., preferably at least 2 p.s.i., and most preferably at least 10 p.s.i. The hydrothermal treatment (or steam calcination) is conducted for a time period sufficient to effect some reduction in the unit cell size of the zeolite. Typically, the time for hydrothermal treatment is between 10 minutes and 4 hours, preferably between 0.5 and 1.5 hours, when using pure steam at a total pressure of 15 p.s.i.g.

Following the steam calcination, the LZ-210 zeolite is subjected to an ammonium ion exchange to reduce the sodium content, typically to a value below 0.5 weight percent, and preferably to below 0.2 weight percent, calculated as $Na_2O$. Methods for ion exchanging zeolites with ammonium ion are well known and therefore need not be described in great detail. Usually, the exchange is accomplished with a warmed solution of an ammonium salt, e.g., ammonium chloride, ammonium nitrate, ammonium acetate, ammonium sulfate, and the like, and the exchange treatment may be repeated with fresh solution one or more times, usually with a water wash between exchange treatments.

Ordinarily, to achieve extremely low sodium levels in the final zeolite, it will prove necessary to repeat the ion exchange procedure at least once if sodium levels below about 0.05 weight percent (calculated as $Na_2O$) are desired. More often, the ion exchange procedure will be repeated at least twice, and occasionally several times, before reductions in sodium content below 0.05 weight percent are achieved.

After the ammonium ion exchange, the LZ-210 zeolite is separated from the ion exchange solution, washed free of any residual ion exchange solution, and then heated at 100° to 200° C. for a time period sufficient to produce a dried product. Usually, time periods of one to two hours prove effective.

The dried zeolite product containing the ammonium cations is useful as an adsorbent, for example, in dehydrating gases containing water vapor. The zeolite product is also useful as a molecular sieve and as a catalyst for promoting hydrocarbon conversion reactions, especially with respect to acid catalyzed hydrocarbon conversion reactions, such as cracking, alkylation, isomerization, etc., or for acid catalyzed reactions coupled with hydrogenative reactions, such as hydrocracking, hydroisomerization, and the like. For cracking, alkylation, and other non-hydrogenative reactions, the zeolite is ordinarily dispersed in a porous refractory oxide matrix usually composed of alumina, silica, magnesia, beryllia, zirconia, titania, thoria, chromia, or combinations thereof, such as silica-alumina, silica-zirconia, and the like. For hydrocracking and other combined hydrogenative-acid catalyzed reactions, one or more hydrogenation components are further added, with Group VIB and VIII metals, often in combination, being utilized for this purpose.

When used for catalytic hydrocarbon conversion purposes, the hydrothermally treated and ammonium-exchanged LZ-210 zeolite is, at some point in the catalyst preparation procedure, calcined at an elevated temperature, usually in the 600° to 1600° F. range, preferably in the 900° to 1500° F. range. This calcination procedure may be applied to the dried zeolite product prior to admixture with other catalytic materials or, as is more often the case, to the zeolite when further combined in particulate form with a precursor of the desired refractory oxide (for instance, alumina gel in the case of alumina, silica gel in the case of silica, etc.), or with a salt containing one or more desired hydrogenation metals, or with both. Calcination after admixture with other catalytic materials serves several purposes at once. In addition to converting the zeolite of the invention to a form more active for acid catalyzed hydrocarbon conversion reactions by the decomposition of the ammonium ions to hydrogen ions and hydroxyl groups, calcination will further convert the refractory oxide precursor to its desired form, e.g., gamma alumina, and the hydrogenation metal salt to the corresponding metal oxide. Further still, the calcination hardens catalytic materials containing refractory oxide precursors into particulates suitable for use in a commercial service, i.e., as a fixed or fluidized bed.

The zeolites of the present invention, although useful in a wide variety of hydrocarbon conversion catalysts, find especial usefulness in hydrocracking catalysts. As stated hereinbefore, the typical hydrocracking catalyst of the invention contains one or more hydrogenation metal components, a porous refractory oxide, and the zeolite of the invention. Ordinarily, the hydrogenation metal chosen is a Group VIB or VIII metal, with at least some of said Group VIII metal usually being incorporated in the zeolite by cation exchange after the ammonium ion exchange or after a calcination subsequent to the ammonium ion exchange. If desired, a Group VIB metal, and particularly molybdenum, may also be ion-exchanged into the zeolite, as for example by the method disclosed in U.S. Pat. No. 4,297,243, herein incorporated by reference. More commonly, however, if a Group VIB metal is utilized, it is usually introduced after the zeolite is admixed with a refractory oxide component, the usual procedure being to calcine the admixture, impregnate with a solution containing the Group VIB metal in an anionic form, such as ammonium heptamolybdate, and calcining again. Normally, the Group VIII metal, if a noble metal, will be introduced by cation exchange prior to admixture with the refractory oxide component, but if a non-noble metal is chosen as the Group VIII metal, it is typically introduced in cationic form into the zeolite by impregnation at a time subsequent to admixing the zeolite and refractory oxide but prior to the final calcination. In this latter embodiment, it is usually the case that the non-noble metal is introduced into the catalyst at the same time as the Group VIB metal, usually by impregnation with an aqueous solution containing Group VIII metal cations and the Group VIB metal in an anionic form.

One of the surprising discoveries of the present invention is that the presence of rare earth elements in the zeolite, although taught as desirable in the previously mentioned Best et al. European patent application, actually proves detrimental when the catalyst is promoted with non-noble metal hydrogenation components. Therefore, in the preferred embodiment of the invention as it relates to non-noble metal hydrogenation catalysts, it is critical in the present invention that the zeolite be essentially free of rare earth elements, and preferably essentially free of all stabilizing polyvalent metals, and most preferably essentially free of all metals except non-noble metal hydrogenation metals.

Catalysts prepared in accordance with this embodiment of the invention contain a non-noble metal selected from the Group VIII metals, preferably nickel or cobalt, or from the Group VIB metals, such as molybdenum, tungsten, or chromium, with molybdenum and tungsten preferred. Most preferably in this embodiment, the catalyst contains both a Group VIB metal and a non-noble metal Group VIII metal in combination, with the most preferred combination being nickel and tungsten. Such catalysts, as stated previously, are usually prepared by impregnating particulates containing the zeolite mixed with a refractory oxide, although it is also possible to admix salts of the desired hydrogenation metal with the zeolite and a refractory oxide component, such as peptized alumina, alumina gel, or hydrated alumina, usually with a binder such as Catapal ® alumina, and then providing the catalyst in particulate form by extrusion through a die having openings of desired size and shape followed by breaking or cutting the extruded matter into lengths of about 1/16 to ½ inch. The preferred procedure differs in that only the zeolite and refractory oxide components are extruded, with the subsequent particulate matter then being impregnated with one or more solutions, and most preferably only one solution, containing the desired hydrogenation metals. In either case, however, the resulting material containing the hydrogenation metal, zeolite, and refractory oxide in particulate form is calcined at an elevated temperature, usually between about 600° and 1600° F., to produce catalytic particles of high crushing strength.

One preferred shape for the calcined particulates is cylindrical, with cross-sectional diameters between about 1/32 and ⅛ inch. Another preferred shape is that of a three-leaf clover, as shown in FIGS. 8 and 8A of U.S. Pat. No. 4,028,227, herein incorporated by reference in its entirety, with the preferred cross-sectional shape having a maximum length D as shown in said FIG. 8A of about 1/22 inch and a lobe diameter d of about 0.28 inch. Extrusions with shapes of four lobes are also among the preferred shapes.

The calcination procedure converts the hydrogenation components into the oxide form, and since hydrocracking catalysts are most active in the sulfide form, the catalyst is generally sulfided. One such method is in situ, i.e., by contact in a hydrocracking reactor with a sulfur-containing feedstock under hydrocracking conditions. However, if it is desired to presulfide the catalyst prior to use in a hydrocracking reactor, the presulfiding can typically be accomplished by contact at an elevated temperature with a reducing gas containing hydrogen sulfide, e.g., a mix of 90 percent H₂ and 10 percent H₂S, by volume.

Typically, the finished catalyst contains at least about 0.3 weight percent of hydrogenation components, calculated as the metals. In the usual instance, wherein a Group VIII metal and a Group VIB metal component are present in combination, the finished catalyst contains between about 5 and 35 percent, preferably between about 10 and 30 percent by weight, calculated as the respective trioxides, of the Group VIB metal components and between about 2 and 15 percent, preferably between 3 and 10 percent by weight, calculated as the respective monoxides, of the Group VIII metal components.

If desired, a phosphorus component may also be incorporated in the catalyst by either comulling the support materials with phosphoric acid or including phosphoric acid in the impregnating solution. Usual and preferred proportions of phosphorus in the catalyst fall in the ranges of 1 to 10 weight percent and 3 to 8 weight percent, calculates as $P_2O_5$.

Hydrocracking catalysts prepared with LZ-210 zeolite are useful in the conversion of a wide variety of hydrocarbon feedstocks to a hydrocarbon product of lower average boiling point and molecular weight. The feedstocks that may be subjected to hydrocracking by the method of the invention include all mineral oils and synthetic oils (e.g., shale oil, tar sand products, etc.) and fractions thereof. Illustrative feedstocks include straight run gas oils, vacuum gas oils, and catcracker distillates. The typical hydrocracking feedstock, however, contains a substantial proportion of components, usually at least 50 percent by volume, often at least 75 percent by volume, boiling above the desired end point of the product, which end point, in the case of gasoline, will generally be in the range of about 380° to 420° F. Usually, the feedstock will also contain gas oil components boiling above 550° F., with highly useful results being achievable with feeds containing at least 30 percent by volume of components boiling between 600° and 1000° F.

For best results in hydrocracking, the catalyst of the invention will be employed as a bed of catalytic particulate in a hydrocracking reactor vessel into which hydrogen and the feedstock are introduced and passed in a downwardly direction. Operating conditions in the reactor vessel are chosen so as to convert the feedstock into the desired product, which, in the preferred embodiment, is a hydrocarbon product containing a substantial proportion of gasoline components boiling, for example, in the $C_4$ to 420° F. or the 185° to 420° F. range. The exact conditions required in a given situation will depend upon the nature of the feedstock, the particular catalyst composition utilized, and the desired product boiling range. But in general, the conditions of operation will fall into the following suitable and preferred ranges shown in the following Table II:

TABLE II

| Conditions | Suitable | Preferred |
|---|---|---|
| Temperature, °F. | 450–850 | 500–800 |
| Pressure, p.s.i.g. | 750–3500 | 1000–3000 |
| LHSV | 0.3–5.0 | 0.5–3.0 |
| H₂/Oil, MSCF/bbl as measured at 60° F. and 1 atmosphere | 1–10 | 2–8 |

The foregoing conditions in Table II are generally correlated so as to achieve a conversion, on a crack per pass basis, of at least 40 percent, preferably at least 50 percent, and most preferably at least 60 percent by volume. The yield of $C_4$ to 420° F. gasoline is usually at least 50 percent, preferably at least 70 percent by volume, on a once-through basis.

The following Examples illustrate the hydrocracking performance of catalysts of the invention. The examples, however, are illustrative only and are not intended to be construed as limiting the scope of the claims. The scope of the invention is defined hereinafter in the claims.

EXAMPLE I

These hydrocracking catalysts were prepared and tested for their activity for hydrocracking against a reference catalyst. The four catalysts were prepared by the following procedures:

Catalyst No. 1

LZ-210 zeolite having a silica-to-alumina ratio of 6.5 was hydrothermally treated by contact for 1 hour at 600° C. and 1 atmosphere pressure with a flowing stream consisting essentially of pure steam. The zeolite was then ammonium-exchanged by introducing 200 grams of the zeolite into a solution consisting essentially of 50 grams of ammonium nitrate in 1,000 cc. deionized water for 3 hours held at a temperature between about 80° and 100° C. The zeolite was then washed with deionized water and the ammonium exchange was repeated. This procedure reduced the sodium content of the zeolite to less than about 0.2 percent, calculated as $Na_2O$.

The zeolite was then mixed with Catapal ® alumina binder such that 80 percent of the mix by weight was zeolite and the remainder the alumina. The mixture was extruded through a die containing circular openings of 1/16 inch diameter, broken into pieces of about ⅛ to ¼ inch in length, and calcined for about 1 hour at 930° F. The extrudates were then impregnated with an aqueous solution containing about 0.2 gm/ml of nickel nitrate ($Ni_2(NO_3)_2.6H_2O$) and 0.33 grams/ml of ammonium metatungstate (90 percent $WO_3$ by weight). After removing excess liquid, the catalyst was dried at about 230° F. and, after gradual heating to 930° F., was then calcined at 930° F. in flowing air for about 1 hour. The final catalyst contained about 4.4 weight percent of nickel components, calculated as NiO, and about 23.0 weight percent tungsten components, calculated as $WO_3$.

Catalyst No. 2

This catalyst was prepared by the same procedure as Catalyst No. 1 except that the LZ-210 zeolite had a silica-to-alumina ratio of 9.1.

Catalyst No. 3

This catalyst was prepared by the same procedure as Catalyst No. 1 except that the LZ-210 zeolite had a silica-to-alumina ratio of 11.7.

The catalysts were then evaluated for hydrocracking activity in separate runs wherein a gas oil feed plus added hydrogen is passed through a laboratory-sized reactor vessel containing 150 cc. of catalyst under the following conditions: 1,450 p.s.i.a., 1.7 LHSV, and a hydrogen-to-oil ratio of 8,000 SCF/bbl. The gas oil feed was a denitrogenated, desulfurized, unconverted fraction obtained from a previous integral hydrofining-hydrocracking operation; it had an API gravity of 38° and a boiling range of about 360° to 870° F., with about 12 percent by volume of the feed boiling below 400° F. To simulate hydrocracking in an H₂S-containing atmosphere, thiophene and tert-butylamine were blended with the feedstock so as to provide respective sulfur and nitrogen concentrations of about 0.5 and about 0.2 eight percent. The operating temperature utilized in the reactor vessel was adjusted periodically to maintain a total liquid product gravity of 47° API, which, by previously established correlations, corresponds to about a 40 volume percent conversion of the feedstock to a C₄ to 420° F. gasoline product.

Each of the three catalysts was compared against a reference catalyst, which reference catalyst was a commercial hydrocracking catalyst. The temperature, after 100 hours of operation, at which the reference catalyst was used to maintain the 40 percent conversion, varied somewhat in the range of about 695° to 705° F., depending upon the reactor unit in which it was run. However, for any given reactor unit, the temperature differential between the catalyst tested therein and the reference catalyst was as follows:

TABLE III

| Catalyst | SiO₂:Al₂O₃ Of Zeolite | Temperature Differential Required to Maintain 40% Conversion |
|---|---|---|
| No. 1 | 6.5 | −8° F. |
| No. 2 | 9.1 | −18° F. |
| No. 3 | 11.7 | −23° F. |

What the foregoing data indicate is that Catalyst No. 1 is 8° F. more active than the reference catalyst, Catalyst No. 2 18° F. more active, and Catalyst No. 3 23° F. more active. The 23° F. differential indicates, based on previous kinetically established correlations, that Catalyst No. 3 is roughly twice as active as the reference catalyst, i.e., if both the reference catalyst and Catalyst No. 3 were tested with all conditions except space velocity held constant, Catalyst No. 3 could process twice as much feed for the same energy input (i.e., heat input by fuel consumption) as the reference catalyst.

The data in Table III also show that the performance of otherwise identical Ni-W-Al₂O₃-LZ-210 zeolite hydrocracking catalysts is a function of the silica-to-alumina ratio of the LZ-210 zeolite. Specifically, the catalysts having an LZ-210 zeolite of silica-to-alumina ratio above 9.0 had much greater activity than Catalyst No. 1 having a silica-to-alumina ratio of only 6.5.

EXAMPLE II

This Example compares the effectiveness of Catalysts Nos. 1 and 2 previously described against similar catalysts containing a rare earth-exchanged zeolite.

Catalyst No. 4

The procedure for preparing Catalyst No. 1 was repeated, except that, before the described hydrothermal treatment, the LZ-210 zeolite was cation-exchanged with a lanthanum-rich rare earth chloride solution so as to introduce rare earth cations into the zeolite.

Catalyst No. 5

The procedure for preparing Catalyst No. 2 was repeated, except that, before the described hydrothermal treatment, the LZ-210 zeolite was cation-exchanged with a lanthanum-rich rare earth chloride solution similar to that described for Catalyst No. 4 under similar conditions.

When compared against the reference catalyst, by the test described in Example I, Catalyst No. 4 was found to be 3° F. less active than the reference catalyst. These data mean, based on the activities shown in Table III, that Catalyst No. 4 was 11° F. less active than Catalyst No. 1—the latter differing in composition only by the absence of rare earths.

Catalyst No. 5 was found to be 5° F. more active than the reference catalyst. But since its comparable catalyst, i.e., Catalyst No. 2, was 18° F. more active than the reference catalyst, Catalyst No. 5 was 13° F. less active than Catalyst No. 2—with, again, the latter only differing by the absence of rare earths.

It will also be seen, from the data just presented in this example, that the absence of rare earth elements even provides an advantage in catalysts containing an LZ-210 zeolite of silica-to-alumina ratio as low as about 6.0. Thus, it is a discovery in the present invention that hydrocracking catalysts containing non-noble Group VIII metals are highly active for hydrocracking with LZ-210 zeolites, and particularly in the preferred embodiment wherein such zeolites are hydrothermally treated and essentially free of cations containing rare earth metals.

Although the invention has been described in conjunction with preferred embodiments and comparative examples, it is evident that many alternatives, modifications, and variations of the invention will be apparent to those skilled in the art in light of the foregoing description. For example, one may use any of a number of porous refractory oxides in conjunction with the LZ-210 zeolite, and the present specification only mentions some. Another which should be mentioned is the dispersion taught in U.S. Pat. No. 4,517,073, herein incorporated by reference in its entirety, which provides for a catalyst useful in the production of both midbarrel and gasoline products. Accordingly, it is intended in the present invention to embrace all such alternatives, modifications, and variations as fall within the spirit and scope of the appended claims.

I claim:

1. A hydrocracking process which comprises contacting a hydrocarbon feedstock under hydrocracking conditions with hydrogen in the presence of a hydrocracking catalyst comprising a Group VIB metal component or a non-noble Group VIII metal component on a support comprising a zeolite aluminosilicate having a mole ratio of oxides in the anhydrous state of

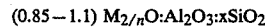
(0.85−1.1) M$_{2/n}$O:Al$_2$O$_3$:xSiO$_2$ wherein M is a cation having a valence of "n" and "x" has a value above 9.0, said aluminosilicate having an X-ray diffraction pattern comprising at least the d-spacings set forth in Table I and having been hydrothermally treated with resultant shrinkage in the unit cell size followed by an ammonium cation exchange.

2. A hydrocracking process as defined in claim 1 wherein the ion exchange sites of said aluminosilicate are essentially free of rare earth metal cations.

3. A hydrocracking process as defined in claim 1 wherein said aluminosilicate is essentially free of noble metals.

4. A hydrocracking process as defined in claim 1 wherein said hydrocracking catalyst consists essentially of Group VIB and non-noble Group VIII metal components on said support.

5. A hydrocracking process as defined in claim 4 wherein "x" has a value between about 11 and about 15.

6. A hydrocracking process as defined in claim 4 wherein said aluminosilicate, prior to said hydrothermal treatment, is produced by contacting a zeolite of the Y crystal structure and a silica-to-alumina mole ratio below 6.0 with an aqueous fluorosilicate solution under conditions causing the silica-to-alumina mole ratio to increase above 9.0 while retaining at least 75 percent of the crystallinity of the zeolite prior to said contacting with said fluorosilicate solution.

7. A hydrocracking process as defined in claim 1 wherein said hydrocracking catalyst comprises a Group VIB metal component and a non-noble Group VIII metal component on said support.

8. A hydrocracking process as defined in claim 7 wherein said Group VIB metal component comprises tungsten and said non-noble Group VIII metal component comprises nickel.

9. A hydrocracking process as defined in claim 4 wherein said Group VIB metal component comprises tungsten and said non-noble Group VIII metal component comprises nickel.

10. A hydrocracking process which comprises contacting a hydrocarbon feedstock under hydrocracking conditions with hydrogen in the presence of a hydrocracking catalyst comprising a Group VIB metal component and a non-noble Group VIII meal component on a support comprising a zeolite aluminosilicate having a mole ratio of oxides in the anhydrous state of $$(0.85-1.1) M_{2/n}O:Al_2O_3:xSiO_2$$

wherein M is a cation having a valence of "n" and "x" has a value above 9.0, said aluminosilicate having an X-ray diffraction pattern comprising at least the d-spacings set forth in Table I and extraneous silicon atoms in the crystal lattice in the form of framework $SiO_4$ tetrahedra, and said aluminosilicate having been hydrothermally treated with resultant shrinkage in the unit cell size followed by an ammonium cation exchange.

11. A hydrocracking process as defined in claim 10 wherein the ion exchange sites of said aluminosilicate are essentially free of rare earth metal cation.

12. A hydrocracking process as defined in claim 11 wherein said aluminosilicate is essentially free of noble metals.

13. A hydrocracking process as defined in claim 11 wherein the metals contained in the ion exchange sites of said aluminosilicate consist essentially of metals selected from the group consisting of Group VIB and non-noble Group VIII metals.

14. A hydrocracking process as defined in claim 11 wherein said hydrocracking catalyst consists essentially of Group VIB and non-noble Group VIII metal components on said support.

15. A hydrocracking process as defined in claim 14 wherein "x" has a value between about 11 and about 15.

16. A hydrocracking process as defined in claim 10 wherein said aluminosilicate, prior to said hydrothermal treatment, is produced by contacting a zeolite of the Y crystal structure and a silica-to-alumina mole ratio below 6.0 with an ammonium fluorosilicate under conditions causing the silica-to-alumina mole ratio to increase to above 9.0 while retaining at least 75 percent of the crystallinity of the zeolite prior to said contacting with said ammonium fluorosilicate.

17. A hydrocracking process as defined in claim 10 wherein said Group VIB metal component comprises tungsten and said non-noble Group VIII metal component comprises nickel.

18. A hydrocracking process as defined in claim 14 wherein said Group VIB metal component comprises tungsten and said non-noble Group VIII metal component comprises nickel.

19. A hydrocracking process which comprises contacting a hydrocarbon feedstock under hydrocracking conditions with hydrogen in the presence of a hydrocracking catalyst comprising a tungsten or molybdenum component and a nickel or cobalt component on a support comprising LZ-210 zeolite having a silica-to-alumina mole ratio greater than about 9.0, said LZ-210 zeolite having been hydrothermally treated with resultant shrinkage in unit cell size followed by an ammonium cation exchange.

20. A hydrocracking process as defined in claim 19 wherein said LZ-210 zeolite has extraneous silicon atoms in the crystal lattice in the form of framework $SiO_4$ tetrahedra.

21. A hydrocracking process as defined in claim 19 wherein the ion exchange sites of said LZ-210 zeolite are essentially free of rare earth metal cations.

22. A hydrocracking process as defined in claim 19 wherein said LZ-210 zeolite is essentially free of noble metals.

23. A hydrocracking process as defined in claim 19 wherein said catalyst consists essentially of tungsten and nickel components on said support.

24. A hydrocracking process as defined in claim 23 wherein said LZ-210 zeolite has a silica-to-alumina mole ratio between about 9 and about 15.

25. A hydrocracking process as defined in claim 19 wherein said LZ-210 zeolite has a silica-to-alumina mole ratio between about 9.1 and about 11.7.

26. A hydrocracking process as defined in claim 8 wherein "x" has a value between about 9 and about 15.

27. A hydrocracking process as defined in claim 8 wherein "x" has a value between about 9.1 and 11.7.

28. A hydrocracking process as defined in claim 26 wherein said support further comprises alumina.

29. A hydrocracking process as defined in claim 27 wherein said support further comprises alumina.

* * * * *

UNITED STATES PATENT AND TRADEMARK OFFICE
CERTIFICATE OF CORRECTION

PATENT NO.   :   4,826,587
DATED        :   05/02/89
INVENTOR(S)  :   John W. Ward, Timothy L. Carlson, William S. Millman It is certified that error appears in the above-identified patent and that said Letters Patent is hereby corrected as shown below:

Col. 11, line 48, claim 11, delete "cation" and insert -- cations --.

Col. 11, line 49, claim 12, delete "11" and insert -- 10 --.

Col. 11, line 52, claim 13, delete "11" and insert -- 10 --.

Col. 11, line 57, claim 14, delete "11" and insert -- 10 --.

Signed and Sealed this

Third Day of July, 1990

*Attest:*

HARRY F. MANBECK, JR.

*Attesting Officer*     *Commissioner of Patents and Trademarks*